US011230489B2

(12) United States Patent
Sato (10) Patent No.: US 11,230,489 B2
(45) Date of Patent: Jan. 25, 2022

(54) METHOD FOR MANUFACTURING POROUS GLASS FINE PARTICLE BODY, MANUFACTURING APPARATUS FOR POROUS GLASS FINE PARTICLE BODY, AND METHOD FOR MANUFACTURING GLASS PREFORM

(71) Applicant: FUJIKURA LTD., Tokyo (JP)

(72) Inventor: Nobutoshi Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 215 days.

(21) Appl. No.: 16/265,374

(22) Filed: Feb. 1, 2019

(65) Prior Publication Data
US 2019/0241458 A1    Aug. 8, 2019

(30) Foreign Application Priority Data

Feb. 5, 2018    (JP) .............................. JP2018-017875

(51) Int. Cl.
*C03B 37/018*    (2006.01)
*C03B 37/014*    (2006.01)

(52) U.S. Cl.
CPC .. *C03B 37/01815* (2013.01); *C03B 37/01413* (2013.01)

(58) Field of Classification Search
None
See application file for complete search history.

(56) References Cited

U.S. PATENT DOCUMENTS 6,047,564 A * 4/2000 Schaper .............. C03B 19/1423
65/17.4
2012/0279259 A1 11/2012 Yamada et al.

FOREIGN PATENT DOCUMENTS

| CN | 103649012 A | 3/2014 |
|---|---|---|
| EP | 0200215 A1 | 11/1986 |
| JP | S61-205629 A | 9/1986 |
| JP | S61-254242 A | 11/1986 |
| JP | S64-047437 A | 2/1989 |
| JP | H04-089322 A | 3/1992 |
| JP | H04-089323 A | 3/1992 |
| JP | H04-175239 A | 6/1992 |
| JP | 2003-212554 A | 7/2003 |
| JP | 2009-102207 A | 5/2009 |
| JP | 2011-246310 A | 12/2011 |
| JP | 2012-232875 A | 11/2012 |

(Continued)

OTHER PUBLICATIONS

Akihiro, Furukawa, JP 2013-246232, Method for producing base material for optical fiber, Dec. 2013. (Year: 2013).*

(Continued)

*Primary Examiner* — Queenie S Dehghan
(74) *Attorney, Agent, or Firm* — Osha Bergman Watanabe & Burton LLP (57) ABSTRACT

A method for manufacturing a porous glass fine particle body including: forming a deposit layer of glass fine particles, generated from raw material gas including a silicon-containing organic compound, on a rotary starting member; supplying the raw material gas to a burner; switching the raw material gas to purge gas; supplying the purge gas to the burner at a first flow rate when the raw material gas is discharged from inside the burner; and switching the first flow rate to a second flow rate smaller than the first flow rate.

13 Claims, 4 Drawing Sheets

(56) References Cited

FOREIGN PATENT DOCUMENTS

| | | | | |
|---|---|---|---|---|
| JP | 2013-095604 A | | 5/2013 | |
| JP | 2013-249232 A | | 12/2013 | |
| JP | 2013249232 A | * | 12/2013 | ....... C03B 37/01413 |
| JP | 2014-125359 A | | 7/2014 | |

OTHER PUBLICATIONS

JP 2013-249232 machine translation, Kanao et al., Method for producing base material for optical fiber, 2013 (Year: 2013).*

* cited by examiner

METHOD FOR MANUFACTURING POROUS GLASS FINE PARTICLE BODY, MANUFACTURING APPARATUS FOR POROUS GLASS FINE PARTICLE BODY, AND METHOD FOR MANUFACTURING GLASS PREFORM

BACKGROUND

Field of the Invention

The present invention relates to a method for manufacturing a porous glass fine particle body, a manufacturing apparatus for a porous glass fine particle body, and a method for manufacturing a glass preform.

This application claims priority to Japanese Patent Application No. 2018-017875 filed on Feb. 5, 2018, the content of which is incorporated herein by reference in its entirety.

Description of Related Art

As shown in Japanese Unexamined Patent Application, First Publication No. 2003-212554, a method for manufacturing a porous glass fine body in which glass fine particles are deposited in a starting member such as a glass rod is known in the related art. If such a porous glass fine particle body is sintered, it is possible to obtain a glass preform for manufacturing an optical fiber and the like.

In addition, Japanese Unexamined Patent Application, First Publication No. 2003-212554 discloses that, on an end portion of a porous glass fine particle body, a gas supplied to a burner is switched from a raw material gas to an inert gas (purge gas) while gradually reducing a flow rate of the raw material gas.

In Japanese Unexamined Patent Application, First Publication No. 2003-212554, silicon tetrachloride is used as a raw material gas. However, when the silicon tetrachloride is reacted, a hydrochloric acid is generated, and thus it is problematic in terms of environmental load, cost for hydrochloric acid treatment, and the like. Here, in recent years, there have been many cases in which a silicon-containing organic compound is used as a raw material of a porous glass fine particle body instead of the silicon tetrachloride.

Meanwhile, since the silicon-containing organic compound has combustibility, in the method disclosed in Japanese Unexamined Patent Application, First Publication No. 2003-212554, in a step of reducing a flow rate of a raw material gas and a step of performing switching to a purge gas, when a velocity of the raw material gas was decreased, there was a possibility of the raw material remaining in the burner igniting and causing a backfire. In addition, when the flow rate of the purge gas is increased in order to suppress the occurrence of a backfire, the purge gas is strongly blown to the porous glass fine particle body and increases a temperature gradient of the porous glass fine particle body. For this reason, there were cases in which damage such as cracks easily occurred in the porous glass fine particle body and the quality deteriorated.

SUMMARY

One or more embodiments of the present invention suppress occurrence of a backfire and deterioration of the quality of the porous glass fine particle body in a case where a silicon-containing organic compound is used as a raw material.

A method for manufacturing a porous glass fine particle body according to one or more embodiments of the present invention includes a step of forming a deposit layer of glass fine particles generated from a raw material gas including a silicon-containing organic compound on a rotary starting member, a step of switching a gas to be supplied to a burner from the raw material gas to a purge gas, a step of supplying the purge gas to the burner at a first flow rate at least during a time when the raw material gas is discharged from inside the burner, and a step of switching the flow rate of the purge gas supplied to the burner to a second flow rate smaller than the first flow rate.

A method for manufacturing a glass preform according to one or more embodiments of the present invention includes a step of sintering the porous glass fine particle body obtained by the first aspect.

A manufacturing apparatus for a porous glass fine particle body according to one or more embodiments of the present invention includes a burner, a raw material gas supply line that supplies a raw material gas including a silicon-containing organic compound to the burner, a purge gas supply line that supplies a purge gas to the burner, a switching mechanism that switches connection and shutoff of the raw material gas supply line and the purge gas supply line to and from the burner, and a control mechanism that is provided on an upstream side from the switching mechanism in the purge gas supply line and controls a supply amount of the purge gas. The control mechanism sets a flow rate of the purge gas supplied to the burner to a first flow rate at least during a time when the raw material gas is discharged from inside the burner, and thereafter switches the first flow rate to a second flow rate smaller than the first flow rate.

According to one or more embodiments of the present invention, in a case where a silicon-containing organic compound is used as a raw material, it is possible to suppress occurrence of the backfire and the deterioration of the quality of the porous glass fine particle body.

BRIEF DESCRIPTION OF THE DRAWINGS

FIGS. 2 (*a*) and 2(*b*) are schematic figures of a gas supply device according to one or more embodiments. FIG. 2(*a*) shows a state in which a raw material gas is supplied to a burner. FIG. 2(*b*) shows a state in which a purge gas is supplied to the burner.

FIGS. 3(*a*) and 3(*b*) are schematic figures of the gas supply device according to one or more embodiments. FIG. 3(*a*) shows a state in which the raw material gas is supplied to the burner. FIG. 3(*b*) shows a state in which the purge gas is supplied to the burner.

DETAILED DESCRIPTION

Hereinafter, a method for manufacturing a porous glass fine particle body and a manufacturing apparatus according to one or more embodiments will be described based on the drawings.

It is possible to obtain an optical fiber preform by applying the porous glass fine particle body obtained by one or more embodiments to an outside vapor deposition (OVD) method, a vapor phase axial deposition (VAD) method or the like, for example.

The OVD method is a method for obtaining a transparent glass by depositing a glass fine particle body on an external surface of a starting member of a glass rod and the like to form a glass soot layer, and then sintering the glass soot layer by heating thereof.

The VAD method is a method for obtaining a transparent glass by starting deposition of glass fine particles from a tip end portion of a starting member of a glass rod and the like to form a columnar glass soot, and then sintering the glass soot by heating it.

However, use of the porous glass fine particle body obtained by one or more embodiments is not limited to manufacturing of the optical fiber preform.

(Manufacturing Apparatus for a Porous Glass Fine Particle Body)

Figure 1:
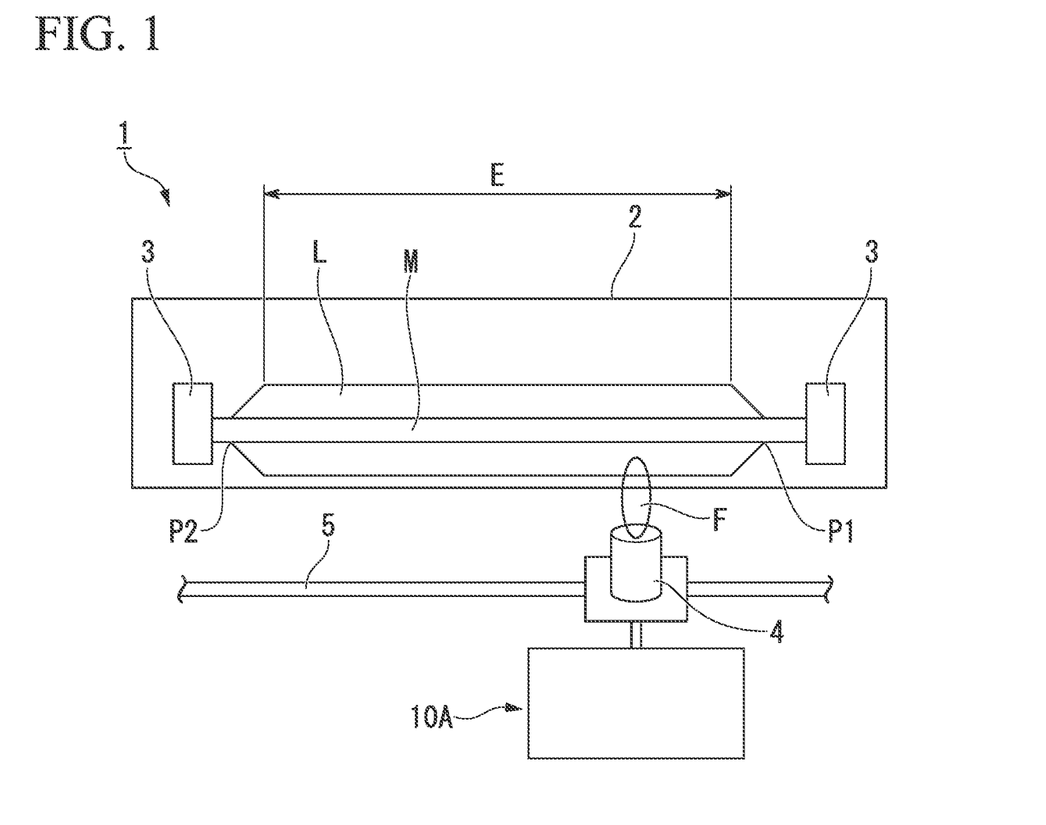
FIG. 1 is a schematic figure of a manufacturing apparatus for a porous glass fine particle body according to one or more embodiments.

As shown in FIG. 1, a manufacturing apparatus (hereinafter, referred to as "manufacturing apparatus 1") for a porous glass fine particle body of one or more embodiments includes a reaction vessel 2, a pair of rotary chucks 3, a burner 4, a rail 5, and a gas supply device 10A.

The pair of rotary chucks 3 support both end portions of a starting member M. The starting member M is rotated inside the reaction vessel 2 by the rotary chucks 3.

The rail 5 extends in the same direction as a longitudinal direction of the starting member M. The burner 4 is movable along the rail 5. That is, the burner 4 is movable in the longitudinal direction of the starting member M.

The burner 4 may move so as to reciprocate on the rail 5 in a longitudinal direction. Alternatively, by forming the rail 5 in an annular shape, for example, a plurality of burners 4 may move so as to circulate on the rail 5 in one direction.

Although the drawing is omitted, instead of the burner 4, the starting member M may reciprocate with respect to the burner 4 and the like in the longitudinal direction of the starting member M.

Figure 2A:
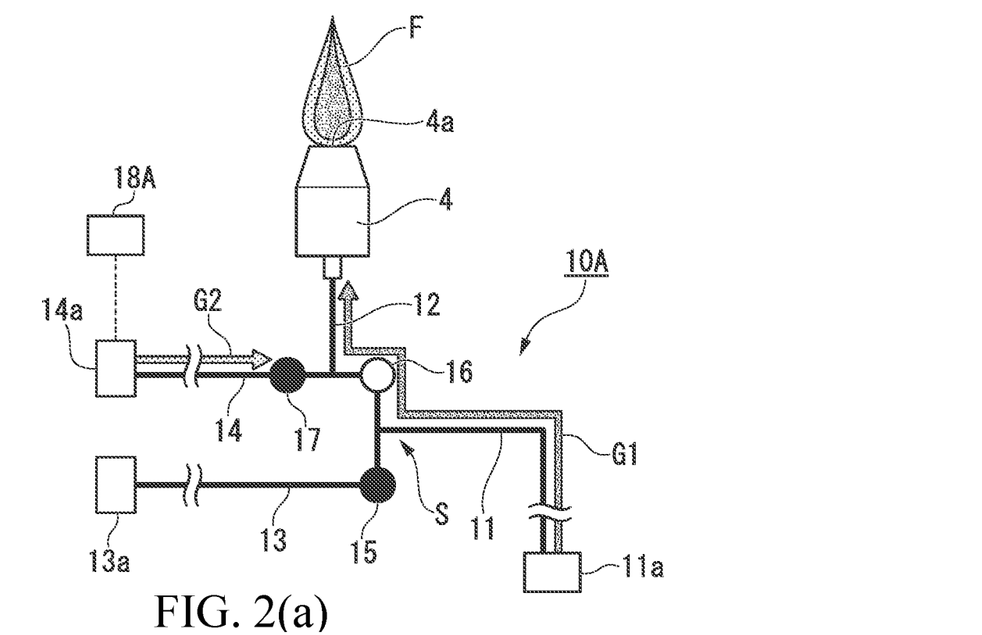

As shown in FIG. 2(a), the gas supply device 10A supplies a gas including a raw material gas G1 to the burner 4. In an outlet 4a of the burner 4, the gas combusts, and a flame F is generated. As the raw material gas G1 reacts inside the flame F, glass fine particles are generated. As the glass fine particles are deposited on a surface of the starting member M, a deposit layer L of the glass fine particles is formed. With this, a porous glass fine particle body is obtained.

Here, in this specification, part of the deposit layer L of which the diameter is substantially constant is referred to as an efficient portion E. The efficient portion E is central area of the deposit layer L. In the efficient portion E, an exposing status of the flame F on the starting member M and a moving speed of the burner 4 are stable, and therefore the glass fine particles are stably deposited. In this reason, the diameter of the efficient portion E becomes substantially constant, and the efficient portion E can be efficiently used for drawing optical fibers after sintering. On the other hand, a diameter of the deposit layer L in the area outside of the efficient portion E is unstable.

As the raw material gas G1, a silicon-containing organic compound such as cyclic siloxane D3 (hexamethyl cyclotrisiloxane), D4 (octamethyl cyclotetrasiloxane), or D5 (decamethyl cyclopentasiloxane) can be used, for example. Since the silicon-containing organic compound does not generate a hydrochloric acid even if the compound is subjected to an oxidative reaction, the silicon-containing organic compound contributes to reduction of environmental load, reduction of manufacturing cost since hydrochloric acid treatment equipment becomes unnecessary, and the like. However, the silicon-containing organic compound has combustibility, and thus a flame is likely to occur.

The gas supply device 10A may supply an oxygen gas and the raw material gas G1 to the burner 4 in a pre-mixed state. Alternatively, the raw material gas G1 and the oxygen gas may be mixed with each other inside the burner 4 or in the vicinity of the outlet 4a of the burner 4.

Here, in a case where the burner 4 reciprocates on the rail 5 in a longitudinal direction, when the raw material gas G1 is continuously supplied to the burner 4, a thickness of the deposit layer L in the vicinity of a turning point of the reciprocal movement of the burner 4 becomes large. For this reason, in order to increase a ratio of the efficient portion E, which is part of the deposit layer L having a uniform thickness, combustion of the raw material gas G1 may be stopped once when the burner 4 reaches the vicinity of an end portion P1 or P2 (in other words, outside of the efficient portion E) of the deposit layer L, and the raw material gas G1 may be combusted again when the burner 4 starts moving toward inside of the longitudinal direction. That is, switching between supply and stop of the raw material gas G1 to the burner 4 may be repeated.

In addition, even in a case where the burner 4 circulates on the annularly formed rail 5 in one direction, switching between supply and stop of the raw material gas G1 to the burner 4 may be repeated. In addition, when the supply of the raw material gas G1 is stopped, to suppresses occurrence of a backfire phenomenon in which a flame is generated inside the burner 4, the raw material gas G1 may be discharged from the outlet 4a of the burner 4.

A configuration of the gas supply device 10A for performing such switching will be described.

(Gas Supply Device)

As shown in FIG. 2(a), the gas supply device 10A includes a raw material gas supply line 11, a raw material gas pipe 12, a vent line 13, a purge gas supply line 14, a first valve 15, a second valve 16, and a third valve 17.

An upstream side of the raw material gas supply line 11 is connected to a raw material gas supply source 11a. The raw material gas supply source 11a supplies the raw material gas G1 to the raw material gas pipe 12 via the raw material gas supply line 11. A downstream side of the raw material gas supply line 11 is branched toward the raw material gas pipe 12 and the vent line 13. The downstream side of the raw material gas supply line 11 is connected to the vent line 13 via the first valve 15, and connected to the raw material gas pipe 12 via the second valve 16.

A downstream side of the raw material gas pipe 12 is connected to the burner 4. An upstream side of the raw material gas pipe 12 is branched toward the raw material gas supply line 11 and the purge gas supply line 14. The downstream side of the raw material gas pipe 12 is connected to the raw material gas supply line 11 via the second valve 16 and connected to the purge gas supply line 14 via the third valve 17.

A downstream side of the vent line 13 is connected to a treatment device 13a. An upstream side of the vent line 13 is connected to the raw material gas supply line 11 via the first valve 15.

An upstream side of the purge gas supply line 14 is connected to a purge gas supply source 14a. The purge gas supply source 14a supplies a purge gas G2 to the raw material gas pipe 12 via the purge gas supply line 14. As the purge gas G2, an inert gas such as nitrogen can be used. A downstream side of the purge gas supply line 14 is connected to the raw material gas pipe 12 via the third valve 17.

A control mechanism 18A is provided in the purge gas supply source 14a. The control mechanism 18A of one or more embodiments is an electronic control unit that electronically controls a flow rate of the purge gas G2 supplied to the burner 4 by the purge gas supply source 14a.

The first valve 15 is disposed between the raw material gas supply line 11 and the vent line 13. The first valve 15 switches between communication and shutoff of the raw material gas supply line 11 and the vent line 13.

The second valve 16 is disposed between the raw material gas supply line 11 and the raw material gas pipe 12. The second valve 16 switches between communication and shutoff of the raw material gas supply line 11 and the raw material gas pipe 12.

The third valve 17 is disposed between the purge gas supply line 14 and the raw material gas pipe 12. The third valve 17 switches between communication and shutoff of the purge gas supply line 14 and the raw material gas pipe 12.

The first valve 15, the second valve 16, and the third valve 17 constitute a switching mechanism S that switches between connection and shutoff of the raw material gas supply line 11 and the purge gas supply line 14 to the burner 4. In addition, the raw material gas pipe 12 connects the switching mechanism S and the burner 4.

The configuration of the switching mechanism S is not limited thereto, and may be appropriately changed as long as the configuration can perform such switching.

Figure 2B:
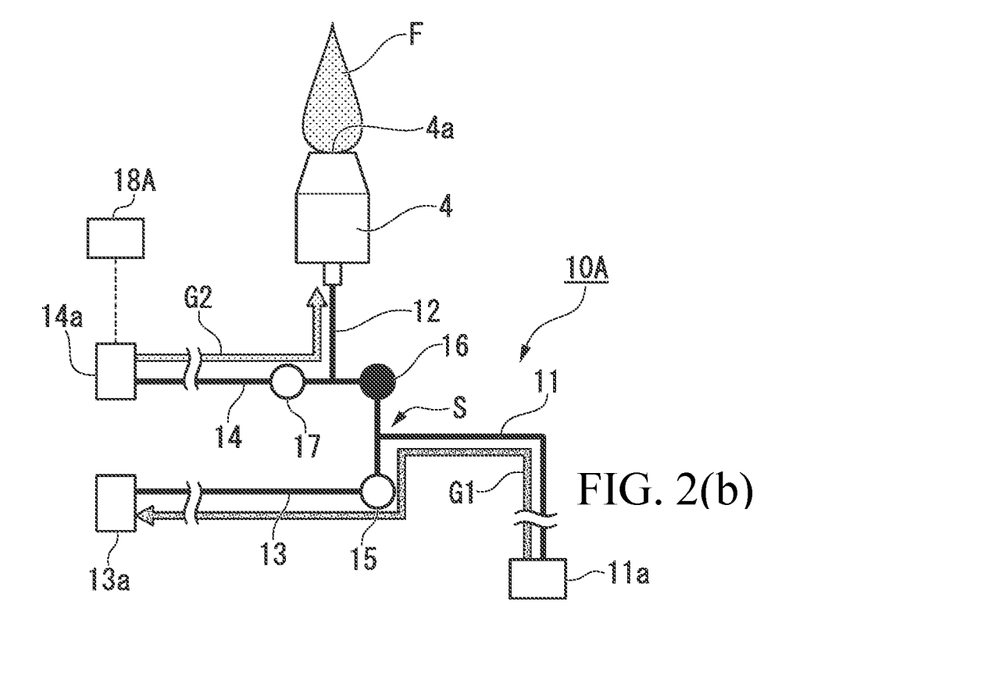

Next, operation of the gas supply device 10A will be described using FIGS. 2(a) and 2(b). In FIGS. 2(a) and 2(b), white circles indicate a state in which the valves 15 to 17 are open and black circles indicate a state in which the valves 15 to 17 are closed.

In a case where the raw material gas G1 is supplied to the burner 4, as shown in FIG. 2(a), the first valve 15 and the third valve 17 are closed and the second valve 16 is opened. With this, the raw material gas supply source 11a and the burner 4 are connected to each other. In this state, the raw material gas G1 flows in the burner 4 through the raw material gas supply line 11, the second valve 16, and the raw material gas pipe 12. The raw material gas G1 combusts at the outlet 4a of the burner 4, and reacts inside the flame F to generate glass fine particles. Since the third valve 17 is closed, the purge gas G2 is not supplied to the burner 4.

Subsequently, to stop the supply of the raw material gas G1, as shown in FIG. 2(b), the first valve 15 and the third valve 17 are opened, and the second valve 16 is closed. With this, connection between the raw material gas supply source 11a and the burner 4 is cut off, and the raw material gas G1 flows toward the vent line 13. On the other hand, since the purge gas supply source 14a and the burner 4 are connected to each other, the purge gas G2 flows in the burner 4. With this, the raw material gas G1 inside the burner 4 is extruded from the outlet 4a. At this time, since a pressure of the purge gas G2 is higher than a pressure in the vicinity of the outlet 4a of the burner 4, the raw material gas G1 is reliably extruded outside the burner 4. As a result, it is possible to suppress occurrence of the backfire phenomenon in which the raw material gas G1 combusts inside the burner 4.

In the above-described operation of the gas supply device 10A, a timing for opening and closing of each of the valves 15 to 17 may be simultaneous, but any timing for opening and closing thereof may be possible within a range in which occurrence of the backfire phenomenon can be suppressed.

As shown in FIG. 2(b) in one or more embodiments, even after the supply of the raw material gas G1 to the burner 4 is stopped, the flame F from the outlet 4a of the burner 4 is generated. This is done to continuously ignite the flame F for assisting combustion of the raw material gas G1, and to thereby promptly start reaction of the raw material gas G1 the next time the raw material gas G1 is supplied.

(Method for Manufacturing a Porous Glass Fine Particle Body)

Next, a method for manufacturing a porous glass fine particle body according to one or more embodiments will be described.

First, the deposit layer L of glass fine particles generated from the raw material gas G1 including a silicon-containing organic compound is formed in the starting member M rotated by the rotary chuck 3. At this time, the gas supply device 10A is in a state shown in FIG. 2(a), and the raw material gas G1 is supplied to the burner 4.

Subsequently, in a state in which the burner 4 is disposed outside of the efficient portion E (for example, in an end portion P1 or P2) of the deposit L of glass fine particles, the gas supplied to the burner 4 is switched from the raw material gas G1 to the purge gas G2. This switching is performed by causing the switching mechanism S to be in the state shown in FIG. 2(b).

Subsequently, the purge gas G2 is supplied to the burner 4 at a first flow rate at least during a time when the raw material gas G1 is discharged from inside the burner 4.

Subsequently, a flow rate of the purge gas G2 supplied to the burner 4 is switched to a second flow rate smaller than the first flow rate. In one or more embodiments, switching from the first flow rate to the second flow rate is performed by a control mechanism 18A which is an electronic control unit.

Subsequently, the switching mechanism S returns to the state shown in FIG. 2(a) to form the deposit layer L of glass fine particles.

By repeating the above operation and setting the deposit L to have a desired thickness, a porous glass fine particle body is obtained.

As described above, in the manufacturing method of one or more embodiments, the purge gas G2 is supplied to the burner 4 at the first flow rate during a time when the raw material gas G1 is discharged from inside the burner 4. With this, the raw material gas G1 inside the burner 4 is reliably discharged. Therefore, it is possible to suppress occurrence of the backfire phenomenon in which the raw material gas G1 combusts inside the burner 4.

In addition, after the raw material gas G1 is discharged from inside the burner 4, the flow rate of the purge gas G2 is switched to the second flow rate smaller than the first flow rate. With this, it is possible to suppress the purge gas G2 from being strongly blown to the deposit layer L of the glass fine particles, which increases a temperature gradient of the deposit layer L, and to thereby suppress occurrence of damage.

In addition, by electronically controlling the flow rate of the purge gas G2 by the control mechanism 18A, adjustment of the first flow rate and the second flow rate becomes easy, and thus it is possible to improve versatility of a manufacturing apparatus 1.

A gas to be supplied from the raw material gas supply line 11 to the burner 4 may be a pre-mixed gas in which the raw material gas G1 and the oxygen gas are mixed with each other. In this case, a mixture ratio of the raw material gas G1 and the oxygen gas is stabilized. With this, it is possible to stably and efficiently react the raw material gas G1 and to suppress attachment of carbon to outside of the porous glass fine particle body (deposit layer L) and inside of the burner 4 due to incomplete combustion.

In addition, although the pre-mixed gas is in an easily-combusting state, and the backfire easily occurs, as described above, it is possible to suppress occurrence of such backfire in one or more embodiments.

In addition, regardless of whether the raw material gas G1 is supplied to the burner 4 (FIG. 2(a)) or the raw material gas G1 is supplied to the vent line 13 (FIG. 2(b)), a flow rate of the raw material gas G1 may be constant all the time. With this, it is possible to more reliably suppress occurrence of the backfire.

In addition, similarly, even in a case where the gas to be supplied to the burner 4 is the pre-mixed gas, regardless of whether the pre-mixed gas is supplied to the burner 4 or the pre-mixed gas is supplied to the vent line 13, a flow rate of the pre-mixed gas may be constant all the time. With this, effects of suppressing occurrence of the backfire, further stabilizing a mixture ratio of the raw material gas G1 and the oxygen gas, and suppressing variation of manufacturing conditions are obtained.

By sintering the porous glass fine particle body obtained by the above-described manufacturing method, a glass preform such as an optical fiber preform may be manufactured. By manufacturing a glass preform by such a manufacturing method, it is possible to stabilize the quality of the glass preform.

In addition, the manufacturing apparatus 1 includes the raw material gas supply line 11 that supplies the raw material gas G1 to the burner 4, the purge gas supply line 14 that supplies the purge gas G2 to the burner 4, the switching mechanism S that switches between connection and shutoff of the raw material gas supply line 11 and the purge gas supply line 14 to and from the burner 4, and the control mechanism 18A that is provided on an upstream side from the switching mechanism S in the purge gas supply line 14 and controls a supply amount of the purge gas G2.

With this configuration, it is possible to easily realize the above-described method for manufacturing a porous gas fine particle body.

Next, additional embodiments of the present invention will be described, and the basic configuration is the same as that of one or more embodiments described above. For this reason, the same reference numerals will be applied in the same configuration and description thereof will be omitted, and only different points will be described. A manufacturing apparatus 1 of one or more embodiments includes a gas supply device 10B as shown in FIG. 3(a).

Figure 3A:
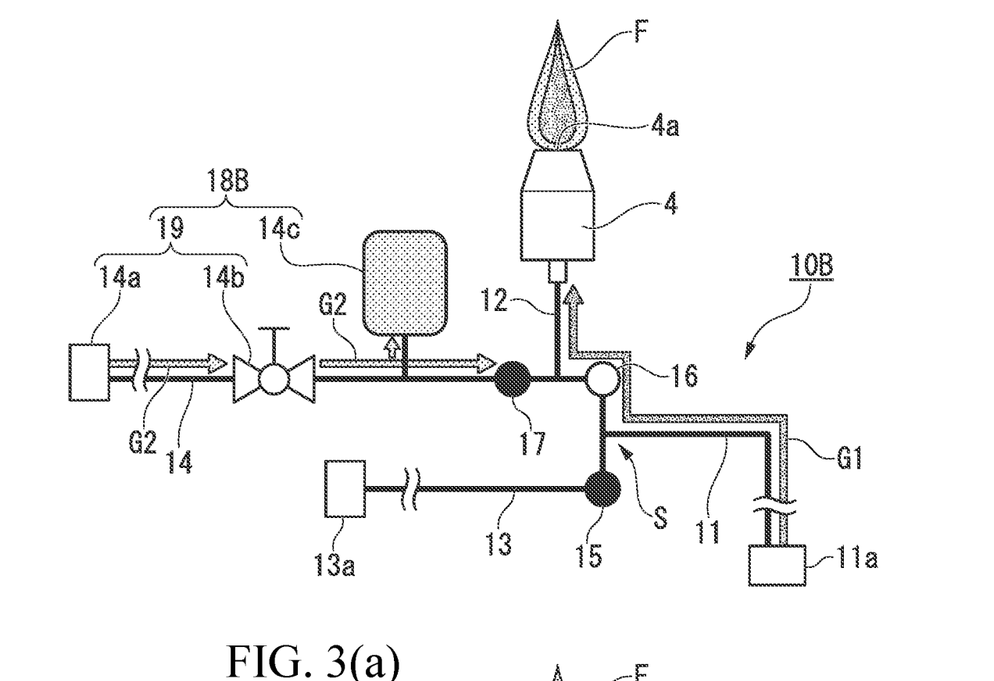

As shown in FIG. 3(a), in the gas supply device 10B of one or more embodiments, a throttle valve 14b and a gas dome 14c are provided in a purge gas supply line 14. The throttle valve 14b and the gas dome 14c are positioned on a downstream side of a purge gas supply source 14a and an upstream side of a third valve 17. The throttle valve 14b is positioned on an upstream side from the gas dome 14c. The gas dome 14c is positioned between the throttle valve 14b and the third valve 17.

The throttle valve 14b adjusts a flow rate of the purge gas G2 supplied toward the burner 4 from the purge gas supply source 14a at a constant amount. That is, the purge gas supply source 14a and the throttle valve 14b constitute a supply mechanism 19 that supplies the constant amount of purge gas G2 toward the burner 4.

The purge gas G2 of a pressure equivalent to that of the purge gas supply line 14 is filled inside the gas dome 14c. In one or more embodiments, a sum (hereinafter, referred to as volume V1) of an inner volume of a portion between the throttle valve 14b and the third valve 17 in the purge gas supply line 14 and an inner volume inside the gas dome 14c is approximately 200 ml. With respect to this, a sum (hereinafter, referred to as volume V2) of an inner volume of the burner 4 and an inner volume of the raw material gas pipe 12 is approximately 25 ml. Thus, the volume V1 is approximately 8 times as large as the volume V2.

Figure 3B:
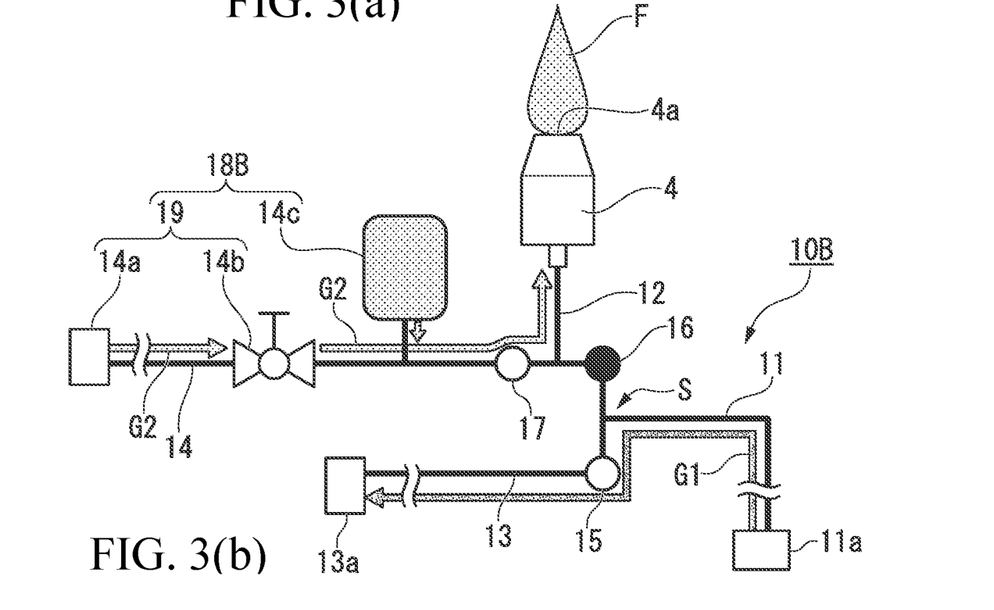

Next, operation of the gas supply device 10B according to one or more embodiments will be described.

In a case where the raw material gas G1 is supplied to the burner 4, as shown in FIG. 3(a), the first valve 15 and the third valve 17 are closed and the second valve 16 is opened. With this, the raw material gas supply source 11a and the burner 4 are connected to each other. In this state, the raw material gas G1 flows in the burner 4 through the raw material gas supply line 11, the second valve 16, and the raw material gas pipe 12. The raw material gas G1 combusts at an outlet 4a of the burner 4, reacts inside the flame F, and thus glass fine particles are generated. Since the third valve 17 is closed, the purge gas G2 is not supplied to the burner 4. However, the gas dome 14c becomes filled with the purge gas G2.

Subsequently, in a case where supply of the raw material gas G1 is stopped, as shown in FIG. 3(b), the first valve 15 and the third valve 17 are opened, and the second valve 16 is closed. With this, connection between the raw material gas supply source 11a and the burner 4 is cut off, and the raw material gas G1 flows toward the vent line 13. On the other hand, since the gas dome 14c and the burner 4 are connected to each other, the purge gas G2 flows in the burner 4. With this, the raw material gas G1 inside the burner 4 is extruded from the outlet 4a. At this time, since a pressure of the purge gas G2 inside the gas dome 14c is higher than a pressure in the vicinity of the outlet 4a of the burner 4, the raw material gas G1 is reliably extruded toward outside of the burner 4.

The purge gas G2 inside the gas dome 14c is supplied to the burner 4, and thus the pressure inside the gas dome 14c is gradually lowered. In accordance with this, the flow rate of the purge gas G2 supplied to the burner 4 is also gradually lowered. Finally, the purge gas G2 is supplied to the burner 4 at a flow rate adjusted by the throttle valve 14b. That is, in one or more embodiments, the flow rate of the purge gas G2 when supplied from the gas dome 14c to the burner 4 is a first flow rate, and the flow rate adjusted by the throttle valve 14b is a second flow rate.

In this manner, the supply mechanism 19 and the gas dome 14c constitute a control mechanism 18B that controls a supply amount of the purge gas G2 to the burner 4.

By causing the control mechanism 18B to include the gas dome 14c, reactivity at the time of switching from the first flow rate to the second flow rate is improved compared to a case where the supply amount of the purge gas G2 is controlled only by electronic control, for example. That is, by promptly performing switching from the first flow rate to the second flow rate, it is possible to suppress the purge gas G2 of a large flow rate from continuously flowing out from the outlet 4a of the burner 4 for an unnecessarily long time. Therefore, it is possible to suppress the purge gas G2 from being strongly blown to a porous glass fine particle body, thereby more reliably suppressing deterioration of the quality.

As described above, in one or more embodiments, by supplying the purge gas G2 from a gas dome 14c provided between a purge gas supply source 14 and the burner 4, the flow rate of the purge gas G2 is set to the first flow rate, and by using a supply mechanism 19 provided on an upstream side from the gas dome 14c, the flow rate of the purge gas G2 is set to the second flow rate.

According to such a configuration, it is possible to promptly switch the flow rate of the purge gas G2 supplied to the burner 4 from the first flow rate to the second flow rate. Therefore, it is possible to suppress the purge gas G2 from continuously flowing out from an outlet of the burner 4 for an unnecessarily long time at the first flow rate. As a result, it is possible to reliably suppress deterioration of the quality of the porous glass fine particle body.

EXAMPLES

Next, a method for manufacturing a porous glass fine particle body according to one or more embodiments will be described using specific examples.

In the present example, in the configuration shown in FIGS. 3(a) and 3(b), the following parameters were set.

Pressure in the purge gas supply line 14 . . . 0.10 MPa or 0.15 MPa

Figure 4:
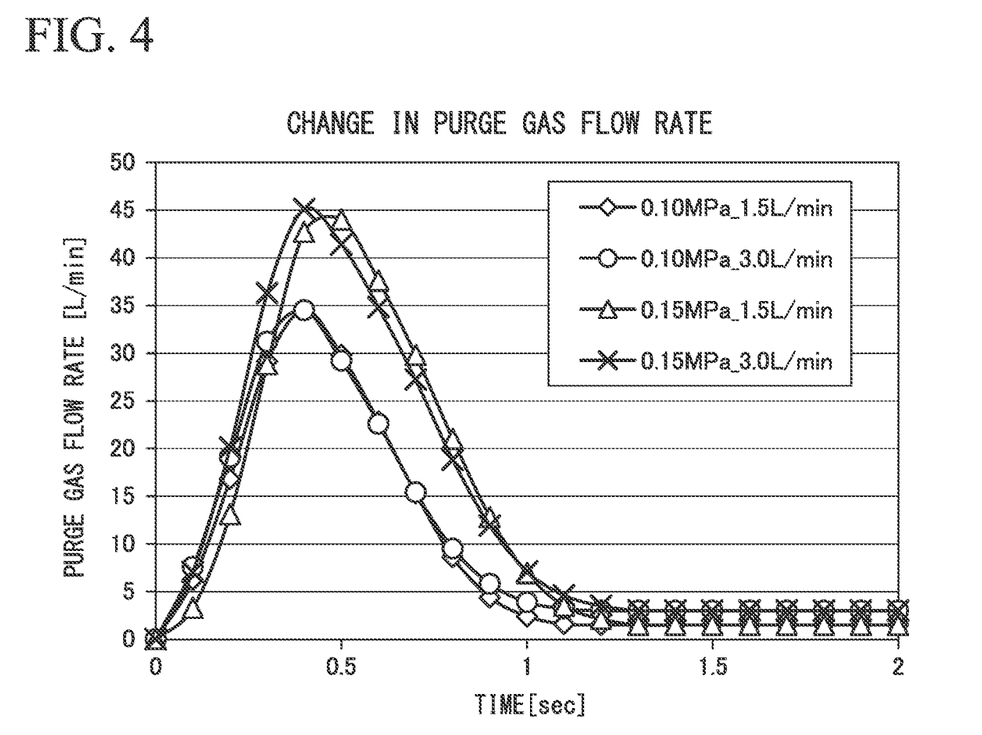
FIG. 4 is a graph showing a transition of a flow rate of the purge gas according to an example.

Flow rate of the purge gas G2 passing a downstream side of the throttle valve 14b . . . 1.5 L/min or 3.0 L/min Volume V1 . . . 200 ml Volume V2 . . . 25 ml FIG. 4 shows a change in a flow rate of the purge gas G2 supplied to the burner 4 at the time of switching the switching mechanism S (valves 15 to 17) from a state shown in FIG. 3(a) to a state shown in FIG. 3(b). The axis of abscissas of FIG. 4 is an elapsed time (seconds) based on the time point of switching the switching mechanism (S), and the axis of ordinates of FIG. 4 is a flow rate (L/min) of the purge gas G2.

As shown in FIG. 4, the flow rate of the purge gas G2 supplied to the burner 4 rapidly increases at the elapsed time of 0.4 to 0.5 seconds and reaches a peak value. This is because the purge gas G2 inside the gas dome 14c is instantaneously supplied toward the burner 4. In the present example, a peak flow rate of the purge gas G2 is set as the first flow rate. The first flow rate varies depending on the conditions, but is in a range of 35 to 45 L/min.

By emitting the purge gas G2 inside the gas dome 14c, the pressure inside the gas dome 14c is also gradually lowered. At the elapsed time of approximately 0.5 to approximately 1.0 seconds, an aspect in which the flow rate of the purge gas G2 supplied to the burner 4 is also gradually decreased in accordance with the lowering of the pressure inside the gas dome 14c is shown.

After that, at a time point of the elapsed time of approximately 1.1 seconds, the pressure inside the gas dome 14c reaches a normal state. With this, the flow rate of the purge gas G2 becomes constant at the flow rate adjusted by the throttle valve 14b. In the present example, the flow rate of the purge gas G2 adjusted by the throttle valve 14b is set as the second flow rate.

In this manner, by causing the control mechanism 18B to include the gas dome 14c, it is possible to instantaneously switch the flow rate of the purge gas G2 supplied to the burner 4 from the first flow rate to the second flow rate smaller than the first flow rate for about 1 second. Therefore, it is possible to suppress the purge gas G2 from being blown to the deposit layer L of the glass fine particles at a large flow rate for an unnecessarily long time while reliably discharging the raw material gas G1 inside the burner 4 by the purge gas G2.

In addition, in the present example, the volume V1 was 200 ml and the volume V2 was 25 ml, and thus the volume V1 was 8 times the volume V2. Under this condition, it was possible to prevent the purge gas G2 from continuously flowing out from the outlet 4a of the burner 4 at a large flow rate for a long time while reliably discharging the raw material gas G1 inside the burner 4 by the purge gas G2. Considering variation and the like, the volume V1 may be 4 to 20 times the volume V2, or may be 6 to 10 times the volume V2.

As described above, the manufacturing apparatus 1 may further include the raw material gas pipe 12 connecting the switching mechanism S and the burner 4 to each other, and the volume V1 which is sum of an inner volume of the purge gas supply line 14 between the supply mechanism S and the switching mechanism 19 and an inner volume of the gas dome 14c may be 4 to 20 times as large as the volume V2 which is sum of an inner volume of the burner 4 and an inner volume of the raw material gas pipe 12.

In this case, while the raw material gas G1 in the burner 4 and the raw material gas pipe 12 is reliably discharged, the purge gas G2 of a large flow rate is suppressed from flowing out from an outlet of the burner 4 for a long time.

The technical scope of the present invention is not limited to the above-described embodiments, and various changes can be added within a scope not departing from the spirit of the present invention.

For example, in FIG. 2(b) and FIG. 3(b), even after supply of the raw material gas G1 to the burner 4 is stopped, the flame F for assisting combustion of the raw material gas G1 is generated. However, in accordance with the stop of the supply of the raw material gas G1, the flame F may be completely extinguished.

In addition, in one or more embodiments, the supply mechanism 19 was constituted of the purge gas supply source 14a and the throttle valve 14b. However, the configuration of the supply mechanism 19 may be appropriately changed. For example, the purge gas supply source 14a and the throttle valve 14b may be integrated.

In addition, the gas dome 14c according to one or more embodiments is not limited to a case where the purge gas supply line 14 is separately provided. For example, a pipe length from the throttle valve 14b to the third valve 17 of the purge gas supply line 14 may be lengthened, and the pipe of that portion may be substituted with a thickened one. Even in this case, by filling the flow path from the throttle valve 14b to the third valve 17 with the purge gas G2 of a pressure higher than the pressure in the vicinity of the outlet 4a of the burner 4, the purge gas G2 of a large flow rate instantaneously flows out when the third valve 17 is opened, and thus it is possible to discharge the raw material gas G1 inside the burner 4.

Further, constituent elements in the above-described embodiments can be appropriately changed to known constituent elements within the scope not departing from the spirit of the present invention. In addition, the above-described embodiments or modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for manufacturing a porous glass fine particle body, the method comprising:
    forming a deposit layer of glass fine particles, generated from raw material gas including a silicon-containing organic compound, on a rotary starting member;
    supplying the raw material gas to a burner;

switching the raw material gas to purge gas;
supplying the purge gas to the burner at a first flow rate when the raw material gas remaining in the burner is discharged from inside the burner; and
switching the first flow rate to a second flow rate smaller than the first flow rate, wherein the second flow rate is greater than 0 L/min.

2. The method according to claim 1, wherein the raw material gas is switched to the purge gas when the burner is positioned outside of an efficient portion of the deposit layer of the glass fine particles.

3. The method according to claim 1, wherein the first flow rate is switched to the second flow rate by electronically controlling the first flow rate of the purge gas.

4. The method according to claim 1, wherein,
the flow rate of the purge gas is set to the first flow rate by supplying the purge gas from a gas dome disposed between a purge gas supply source and the burner, and
the flow rate of the purge gas is set to the second flow rate by using a supply mechanism disposed on an upstream side from the gas dome.

5. The method according to claim 1, wherein a flow rate of the raw material gas is constant regardless of whether the raw material gas is supplied to the burner or a vent line.

6. The method for manufacturing a porous glass fine particle body according to claim 5,
wherein, when switching the gas to be supplied to the burner from the raw material gas to the purge gas, a flow path of the raw material gas connecting a raw material gas supply source to the burner is shutoff.

7. The method according to claim 1, wherein pre-mixed gas of the raw material gas and oxygen gas is supplied to the burner.

8. The method according to claim 7, wherein a flow rate of the pre-mixed gas is constant regardless of whether the pre-mixed gas is supplied to the burner or the vent line.

9. The method for manufacturing a porous glass fine particle body according to claim 7, wherein a flow rate of the pre-mixed gas supplied from a raw material gas supply line to the burner is constant when the glass fine particles are deposited on an external surface of the starting member.

10. A method for manufacturing a glass preform, comprising:
sintering the porous glass fine particle body obtained by the method according to claim 1.

11. The method for manufacturing a porous glass fine particle body according to claim 1, wherein the first flow rate is set such that a backfire that combusts inside the burner does not occur.

12. The method for manufacturing a porous glass fine particle body according to claim 1, wherein a flow rate of a gas supplied from a raw material gas supply line to the burner is constant when the glass fine particles are deposited on an external surface of the starting member.

13. The method for manufacturing a porous glass fine particle body according to claim 1, wherein a supply of the raw material gas to the burner is stopped to change a flow path of the raw material gas by switching a valve, such that the raw material gas flows toward a vent line.

* * * * *